(12) United States Patent
Abersfelder et al.

(10) Patent No.: US 6,213,627 B1
(45) Date of Patent: Apr. 10, 2001

(54) ILLUMINATING SYSTEM

(75) Inventors: Guenter Abersfelder; Helmut Grantz, both of Sindelfingen; Thorsteinn Halldorsson, Munich; Horst Schmidt-Bischoffshausen, Neubiberg; Stefan Uhl, Stuttgart; Heinrich Alexander Eberl, Probstried, all of (DE)

(73) Assignees: DaimlerChrysler AG, Stuttgart (DE); Herr Heinrich A. Eberl, Probstried (DE)

( * ) Notice: Subject to any disclaimer, the term of this patent is extended or adjusted under 35 U.S.C. 154(b) by 0 days.

(21) Appl. No.: 09/118,380

(22) Filed: Jul. 17, 1998

(30) Foreign Application Priority Data

Jul. 17, 1997 (DE) ............................ 197 30 564

(51) Int. Cl.$^7$ ............................................... G02F 1/1335
(52) U.S. Cl. .................. 362/487; 359/599; 359/608; 359/613; 362/296
(58) Field of Search ........................ 362/487, 296; 359/599, 608, 613

(56) References Cited

U.S. PATENT DOCUMENTS

| 3,944,322 | * | 3/1976 | Benton | 359/15 |
| 4,704,666 | | 11/1987 | Davis | 362/296 |
| 4,713,738 | | 12/1987 | Davis | 362/296 |
| 4,832,427 | * | 5/1989 | Nanba et al. | 359/15 |
| 4,989,071 | * | 1/1991 | Hopwood | 358/2 |
| 5,037,166 | * | 8/1991 | Malcolm et al. | 359/15 |
| 5,278,532 | * | 1/1994 | Hegg et al. | 345/7 |
| 5,630,661 | | 5/1997 | Fox | 362/187 |

FOREIGN PATENT DOCUMENTS

| 0 733 928 A2 | 9/1996 | (EP) . |
| 6-16085 | 1/1994 | (JP) . |
| 7-14407 | 1/1995 | (JP) . |
| 8-272328 | 10/1996 | (JP) . |
| 9-80311 | 3/1997 | (JP) . |
| 9-152553 | 6/1997 | (JP) . |
| WO96/07953A1 | 3/1996 | (WO) . |

OTHER PUBLICATIONS

Veligdan, James T. "Unique Interactive Projection Display Screen." Brookhaven National Laboratory, Upton, New York.

* cited by examiner

Primary Examiner—Mohammad Y. Sikder
(74) Attorney, Agent, or Firm—Evenson, McKeown, Edwards & Lenahan, P.L.L.C.

(57) ABSTRACT

A method and apparatus for transmitting light, wherein a holographic video screen is used as part of an illuminating system. The tendency of such a video screen to backscatter light of certain wavelengths from a predefined direction into a certain solid angle area is utilized to generate holographic images at precisely defined angles. In ambient light, such a video screen need not appear black, or at least dark.

19 Claims, 2 Drawing Sheets

ILLUMINATING SYSTEM

BACKGROUND AND SUMMARY OF THE INVENTION

This application claims the priority of German Patent No. 197 30 564.4, filed Jul. 17, 1997, the disclosure of which is expressly incorporated by reference herein.

The present invention relates to an illuminating system which has a light source and an arrangement for distributing light, for example, in an automobile.

Known illuminating systems conventionally use a light source for the direct illumination of objects. In order to permit a directed dispersion of rays, normally lens systems and/or mirror systems are used. For a diffuse dispersion of rays, diffusing lenses or diffusely reflecting luminescent screens are used. In this case, a large portion of the energy for the generation of light via the so-called thermal radiating devices which are used as the light source is lost by the generation of heat and by losses. An example of this is in the case of diffusing lenses. In addition, the color of the light is essentially determined by the light source itself and can be changed only with losses by the filtering effect of colored filtering disks or reflection surfaces. A no-loss active changing of the color of the light is not possible.

From German patent documents 197 00 162.9 and 197 03 592.2, which are not prior art, it is known to provide a holographic video screen for a laser front projection and a laser rear projection. In normal ambient light, this video screen is black. However, for certain wavelengths of the light, this video screen can be constructed such that this light is transmitted or reflected at a certain fixed angle. According to statements in these two patent references, this video screen does not have to have a plane construction. On the contrary, it is possible to construct this video screen with an almost arbitrary surface contour. For details regarding such a video screen, the disclosures of the above-referenced German patent documents are expressly incorporated by reference herein.

From non prior art reference, Veligdan James T. "Unique Interactive Projection Display Scree." Brookhaven National Laboratory, Upton, N.Y., systems utilizing Sheimpflug type optics are known. For details regarding such Sheimpflug type optical devices, the disclosure of the above-referenced document is expressly incorporated by reference herein.

It is an object of the present invention to provide an arrangement for distributing light in an illuminating system such as a holographic video screen.

This and other objects and advantages are achieved by the arrangement according to the invention, in which the tendency of such a video screen to backscatter light of certain wavelengths from a predefined direction into a certain solid angle area is utilized. In ambient light, such a video screen need not appear black (or at least dark) because for an illuminating system used in the dark the darkness of the screen is insignificant.

Additionally utilized is the characteristic that the video screen surface, which was holographically obtained for the holographic video screen, need not be non-planar but may also have, for example, the shape of a reflector. As a result, the characteristic of this reflector is transmitted to the holographic video screen.

Extensive freedom therefore exists with respect to the design of illuminating elements with choosing their color and shape. As a result, for example, flat, uniformly bright luminous elements can be produced which emit their light at a precisely defined angle and uniformly illuminate the irradiated objects so that the luminous element appears bright only when viewed within the illuminating angle. For such luminous elements, the projection light sources should be arranged such that they are not visible themselves. Without any special blank-out or shading devices, such an arrangement prevents disturbing influences caused by looking at the bright light source. The light of the light source therefore remains invisible for each observer as long as he is not within the light cone. Possibilities of an advantageous use are therefore provided, for example, as unobtrusive studio lights in the area of the angle of view of the camera.

In an embodiment of the illuminating system, the video screen appears gray or colored when placed in ambient light. As a result, a large variety of design colors is permitted.

In another embodiment of the illuminating system, as a result of a correspondingly extending shading from white to gray of the video screen surface (by which the hologram is produced) a possibly non-uniform light distribution of the projection system is compensated.

It can therefore be manufactured in a simpler manner and at a more reasonable cost. As a rule, simple metal oxide vaporized mirror halogen lamps are sufficient. From the white light of these lamps, only those light wavelengths which correspond to the laser wavelengths which were used for producing this video screen are backscattered or transmitted. As a result, for example, the irradiation of infrared thermal rays is prevented. The light composed of the colors red, green and blue nevertheless appears white.

In a further development of the embodiments of the invention, the hologram is white. Colored projection light is therefore reproduced in the same color.

In an alternative further development of the embodiments of the invention, the hologram is colored. This results in a light change from white projection light to the color of the hologram if this hologram represents a colored video screen. If the light has fractions of the hologram color or white light fractions, only these are changed into the hologram color. The colors red, green and blue can generally be used for the colored display.

In yet another embodiment of the invention, the illuminating system has a narrow-band white light incandescent light or an energy-saving laser as a light source. Furthermore, the hologram of a reflecting surface results in an almost no-loss utilization of the light flow of the projection light source into the desired direction at the desired angle. The shape and dimensions of the video screen may be freely designed. A particularly good utilization is obtained if the usable video screen surface corresponds to the overall size.

In still another embodiment of the invention, the illuminating system is used in street lighting. In contrast to conventional street lighting whose illuminating elements can produce blinding light in the eyes of drivers, via the holographic video screen, street lights can be implemented which do not generate blinding light. The illuminating element acts black, for example, in the driver's vision, while the environment is illuminated. Naturally, in this case, the actual illuminating bodies must be arranged such that they are shielded themselves. Additionally, when a laser is used as a light source, considerable amounts of electric energy can be saved. The savings may be in the order of 90%.

In a further embodiment of the invention, such an illuminating system is used in film and photo studios or for stage lighting. As mentioned previously, illuminating elements can be produced whose flat dimension permits an illumination which is completely free of shading. This can, for example, replace light tanks or reflection screens in photo studios. For photo purposes, the holograms can also be illuminated by flashes in order to generate a very high light current for a short time. When high-power lasers are used, very high luminous powers are possible even for a very short time for such flash systems. This is without any danger caused by the laser light as the result of the large-surface beaming.

In an even further embodiment of the present invention, such an illuminating system is used for illuminating temperature-sensitive objects. Since the actual light source irradiates only the hologram and the hologram itself supplies only scattered light, temperature-sensitive objects can be brightly illuminated. In this case, a direct front projection was found to be advantageous. For this purpose, it is particularly advantageous to arrange either the thermal light source as the radiating device away from the reflection screen or, even better to use lasers as a light source which do not beam in the infra-red.

A particularly advantageous field of application of such a cold light source is, for example, the illumination of television and film studios, whereby the thermal stress to the actors and operators is reduced. When lasers are used as the light source, via a suitable modulation without filters, any desired light color can be adjusted (without losses) for special stage effects.

In still a further embodiment of the invention, the illuminating system is used as a point light source of a projection system or a spotlight system. The hologram of a bright or reflecting point permits the representation of an almost ideal point light source for high-quality project systems or spotlight systems.

In yet another embodiment of the invention, the illuminating system is used as a portable and movable light. It is advantageous, for example, for a use as a light for cameras. In this case, it is also advantageous that the light can be operated in an energy-saving manner.

In another embodiment of the present invention, the illuminating system is used as a light signal of a motor vehicle. Light signals, which cannot be recognized or are difficult to recognize in daylight or when subjected to sun radiation (such as turn signals or brake lights), become clearly visible. Furthermore, the manufacturing is simpler than in the case of conventional systems.

In yet another embodiment of the present invention, the illuminating system containing such a video screen is used as an interior illuminator of a vehicle. The directional selectivity of the holographic video screen, in principle, permits interior illumination for vehicles of all types which does not disturb the driver. At the same time, simultaneous use of the video in this manner provides an excellent reading lighting for the occupants.

In still another embodiment of the present invention, the illumination system with such a video screen is used as a headlight of a vehicle. The imaging of the lens/reflector system of the headlight as a hologram permits the display of headlights, which appear black in daylight, and, from a different direction than the beaming direction of the headlight, cannot be recognized as a disturbing light source. In addition, more creative designs of the mounting of the light source is possible. On the whole, the headlight system can be flat.

The use as a transportable light will be a particularly advantageous field of application when an energy supply from the outside is hard to implement. The energy savings of more than 90% when a laser is used as a light source, makes the use particularly interesting, for example, as a camera light or as a light system for expeditions.

Since, in the case of a use as an illuminating system, external light influences play no role in darkness, low requirements exist with respect to the absorption characteristics of the video screen system. Accordingly, an almost free color selection of the appearance of the image of the holographic illumination is possible in ambient light. This light device can therefore be adapted in its color to the design of the environment as well as to the color of the vehicle. After the activation of the light source, the light dispersion will then take place according to the color of the hologram or the color of the light source.

Other objects, advantages and novel features of the present invention will become apparent from the following detailed description of the invention when considered in conjunction with the accompanying drawings.

DETAILED DESCRIPTION OF THE DRAWINGS

Figure 1:
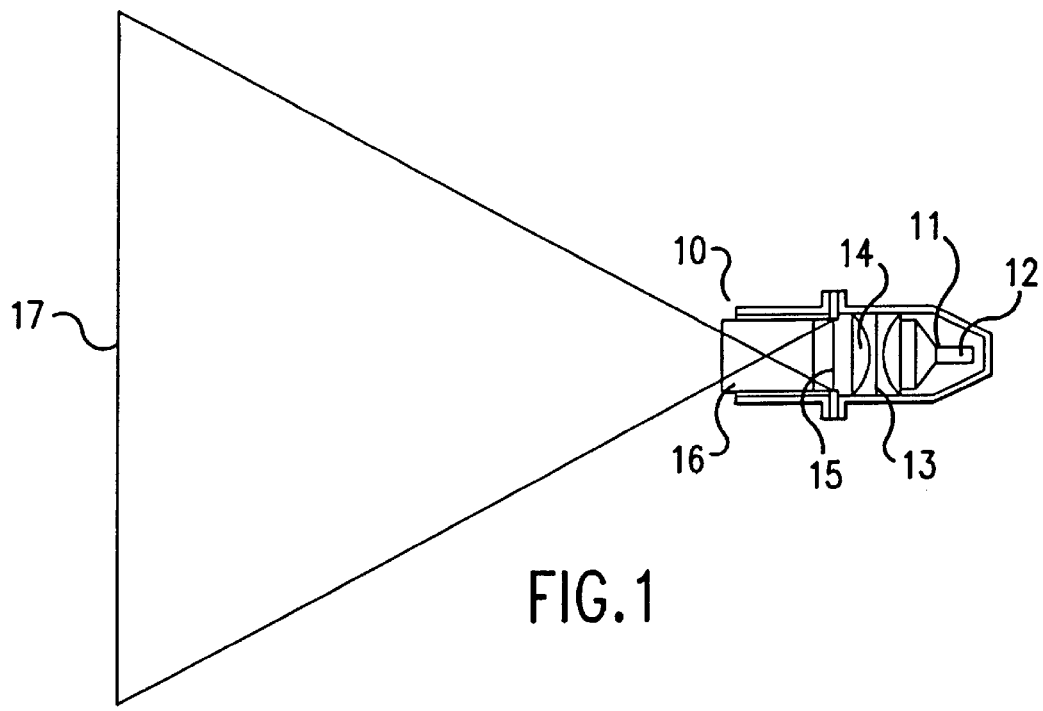
FIG. 1 shows an illumination system according to a preferred embodiment of the invention.

FIG. 1 shows a first embodiment of a projection system 10. A light bulb 11 and a ellipsoid reflector 12 are situated in the projection system 10. The light is transmitted to a display 15, e.g., a holographic video screen such as an LCD display, via a heat protection filter 13 and a condenser 14. Also included is a lens 16. Reference numeral 17 indicates the projection surface. This is a projection system for a holographic display via white light and a small LCD display 15 in the beam path.

Figure 2:
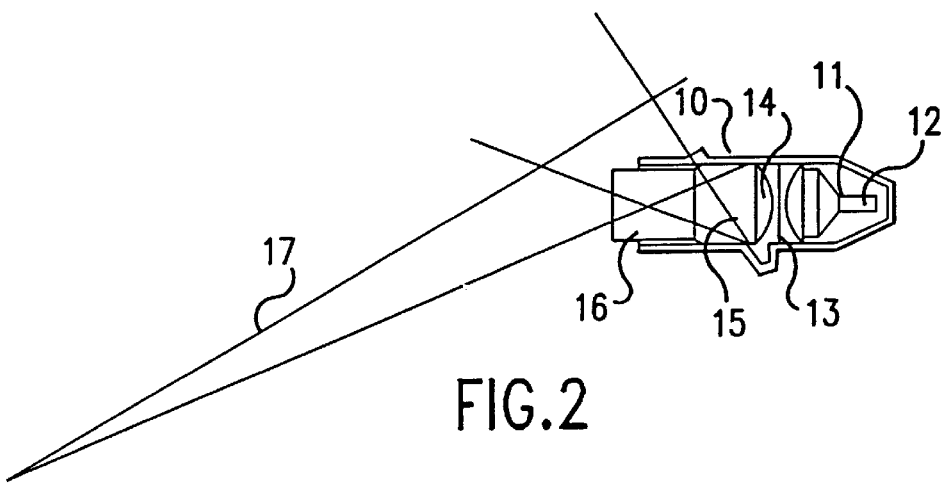
FIG. 2 shows another embodiment of the illuminating system according to a preferred embodiment of the invention.

FIG. 2 illustrates a diagonal projection system with Scheimpflug optics in an embodiment of the projection system. Components which are identical with respect to FIG. 1 have the same reference numbers. Here, the dimensions of both projection systems amount to only a few centimeters.

Figure 3:
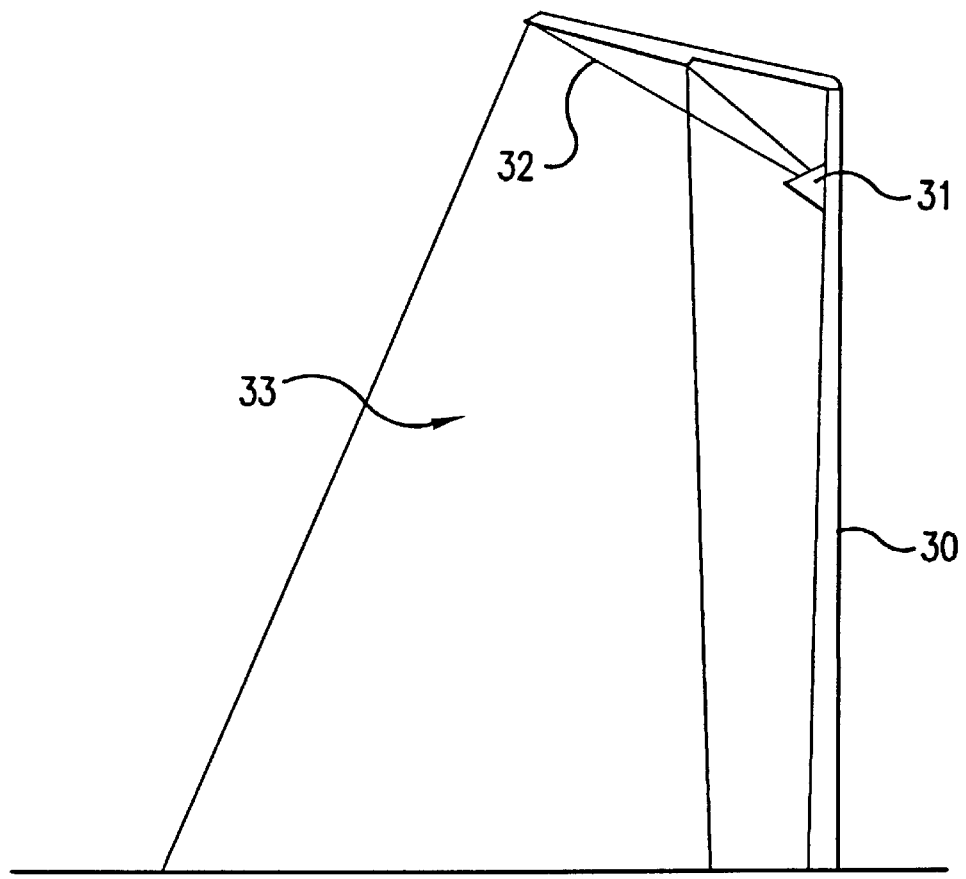
FIG. 3 shows an embodiment of the invention in use as street lighting.

FIG. 3 illustrates an embodiment of a street lighting system. A street light 30 has a lamp housing 31 whose light source is shielded. Furthermore, this street light 30 has a holographic surface 32. The resulting illumination pattern is illustrated as light cone 33.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for illuminating an area of a vehicle; comprising:
   a light source; and
   an arrangement for distributing light according to a desired illumination in said area; wherein
   the arrangement for distributing light comprises a holographic video screen onto which a light beam from said light source is directed; and the holographic video screen has recorded therein a hologram containing an image of an illuminating element, which illuminating element is oriented such that it directs light into an area which is to be illuminated within a predetermined illumination angle, and is substantially invisible outside of said illumination angle.

2. The illuminating system according to claim 1, wherein the video screen has a visual appearance which is one of gray and colored in ambient light.

3. The illuminating system according to claim 1, wherein non-uniform light distributions of a projection system are compensated by providing a surface of the video screen with a surface coloration which varies from white to gray.

4. The illuminating system according to claim 1, wherein a holographic image is produced from a surface of the video screen.

5. The illuminating system according to claim 1, wherein a hologram is white.

6. The illuminating system according to claim 1, wherein said holographic screen has a colored hologram recorded therein.

7. The illuminating system according to claim 1, wherein one of a narrow-band white-light incandescent lamp and an energy-saving laser is used as the light source.

8. A method of illuminating an area with an illuminating system, comprising the steps of:

providing a light source;

directing light from said light source onto a light distributing arrangement comprising a holographic video screen having a hologram recorded therein, said hologram containing an image of an illuminating element which is oriented such that it directs light within a predetermined illumination angle; and directing said light from said image of said illuminating element into a desired illumination area.

9. The method according to claim 8, wherein the step of directing illumination comprises providing the light in one of a photo studio and a stage lighting system.

10. The method according to claim 8, wherein the step of directing illumination comprises illuminating temperature-sensitive objects.

11. The method according to claim 8, wherein the step of providing a light source comprises providing one of a point light source of a projection system and a spotlight system.

12. The method according to claim 8, wherein the step of directing illumination comprises providing a portable light.

13. The method according to claim 8, wherein the step of directing illumination comprises providing a light signal for a motor vehicle.

14. The method according to claim 8, wherein the step of directing illumination comprises illuminating the interior of a vehicle.

15. The method according to claim 8, wherein the step of directing illumination comprises providing the light as a headlight of a vehicle.

16. A light source for illuminating an area comprising:

a holographic screen;

a light source for directing a first light beam onto said holographic screen; and a hologram recorded in said holographic screen, which hologram generates a holographic image of an illumination element, which is oriented such that it projects a second light beam into a desired illumination area.

17. A light source for illuminating an area according to claim 16 wherein light from said holographic screen is directed into a predetermined solid angle area.

18. A light source for illuminating an area according to claim 16 wherein light from said holographic screen has a predetermined desired wavelength range.

19. A system for illuminating an area, comprising:

a holographic screen;

a hologram recorded in said screen, said hologram containing an image of an illuminating element which is oriented such that it emits light substantially limited to an illuminating angle, said illuminating element being oriented in said image such that light within said illumination angle is directed into said area which is to be illuminated; and a light source oriented to direct a light beam onto said holographic screen.

* * * * *